Patented Sept. 1, 1931

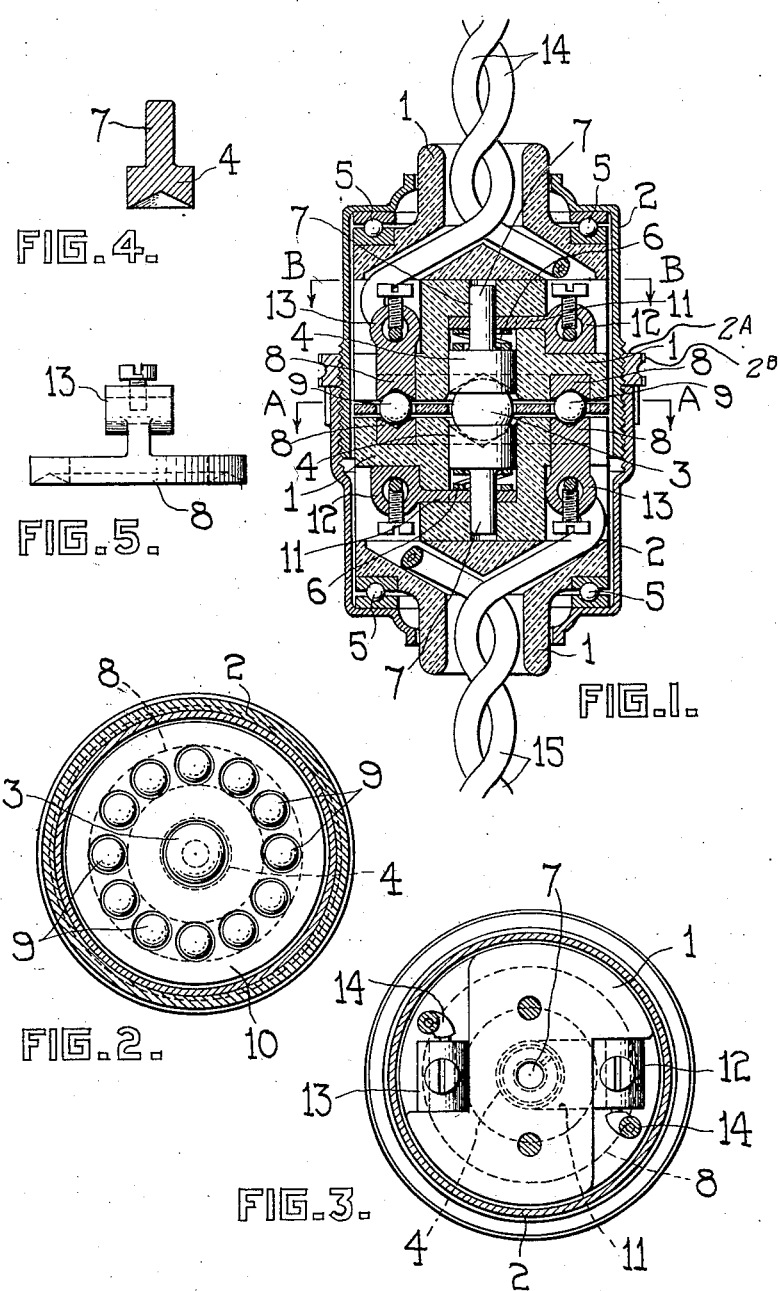

1,821,132

UNITED STATES PATENT OFFICE

CHARLES GOATER BAKER, OF TIMARU, NEW ZEALAND

SWIVEL CONNECTION FOR ELECTRIC CABLES AND THE LIKE

Application filed January 26, 1928, Serial No. 249,702, and in New Zealand October 31, 1927.

This invention relates to fittings for insertion in or use in connection with flexible electric cables and the like, whereby the latter can be turned and moved about without twisting or knotting it, said fittting being freely turnable while permitting an uninterrupted flow of electricity through the same and the cable.

The device provided by this invention comprises a pair of substantially cylindrical non-conducting members positioned in axial alignment within a suitable casing so as to be separately turnable therein upon a central ball pivot mounted between metal cups secured in the centres of the adjacent ends of said cylindrical non-conducting members.

Grooved metal rings also mounted in the adjacent ends of the non-conducting members concentrically with the central ball pivot, provide a race in which a plurality of metal balls are mounted.

Electric wires of a cable or the like are connected to the central metal cups and to the metal rings of the ball race in each non-conducting member and are passed out of the latter and the casing at opposite ends thereof.

Electric contact between the cups and rings in each non-conducting member is maintained through the balls held between the said cups and the balls positioned between the grooves in the metal rings, so that no matter how the flexible cables may be twisted or turned, such movement is absorbed by the free turning movement within the casing of the non-conducting members, while electrical contact is maintained through the pivot ball and the balls of the ball race.

The invention, will however, be more particularly described with reference to the accompanying drawings, wherein:—

Figure 1 is an enlarged longitudinal section of the fitting designed for use in electric lighting and light power cables, and Figure 2 is a cross sectional view thereof on the line A—A, Figure 1, Figure 3 is a cross sectional view on the line B—B, Figure 1, while Figure 4 is a sectional view of one of the central metal cups, and Figure 5 is a side elevation of one of the grooved metal rings.

There is provided two members 1 formed of non-conducting material and substantially of cylindrical shape, located within a convenient casing 2 so as to be separately and freely rotatable in the latter.

A ball 3 of fairly large diameter is positioned and held between a pair of metal cups 4 provided centrally in the adjacent ends of each of the non-conducting members 1, and provides a pivot on and about which said members turn. Ball races 5 are provided between the outer ends of the members 1 and the ends of the casing 2 to further assist the free rotation of said members within the latter.

The metal cups 4 are slidable in the line of the axis of the members 1 in recesses in the latter, and are pressed against the ball 3 by means of springs or spring washers 6 located between them and the inner ends of the recesses and surrounding spindles or shanks 7 formed on said cups 4.

Also situated in the adjacent ends of the members 1 are a pair of grooved metal rings 8 positioned concentrically around the ball 3 and adapted to receive and hold between them in their respective grooves, a plurality of metal balls 9 preferably spaced apart by means of a perforated disc or cage 10 formed of non-conducting material.

The metal cups 4 are connected through their shanks 7 and through arms 11 engaged on the latter, with suitable terminals 12 to which one wire each of the cut ends of an electric cable 14 can be joined, and the rings 8 are similarly joined or connected to a further pair of terminals 13 to which the other wires of the cable ends 15 are connected, the latter being entered centrally through the ends of the casing 2 and non-conducting members 1 and then separated and the wires lead to their respective terminals.

Should either of the cables 14 or 15 be twisted or turned, the member 1 to which such cable is connected will be similarly turned within the casing 2 thereby absorbing such movement and preventing knotting and tangling of the cable as occurs at present, a constant flow of electric current between the cables 14 and 15 being maintained through the cups 4 and ball 3 and rings 8 and balls 9 respectively connected to the flow and return wires of each cable.

The casing 2 is conveniently formed in halves for facilitating assembling and adjustment of the device. In order to ensure interlocking engagement between the two halves, a member is employed comprising an annular ring 2A of suitable material having an internal screw thread cut to register with the external thread on one part of the casing 2. The outer surface of the ring may be knurled as at 2B to ensure a reasonably good finger grip for the purpose of locking the case in its adjusted position.

The device provided by this invention can be inserted in flexible wires used in lighting extensions, in telephone cords and the like, and the casing 2 can, if desired, be formed integrally with or be attached to an outlet socket, telephone base or the like. Suitably designed it can also be used in the electric supply cables of electric drills and similar portable electric machinery and tools to prevent twisting of such supply cables.

What I claim and desire to obtain by Letters Patent of the United States of America is:—

A swivel connection for electric cables, comprising a casing formed in abutting halves threaded one upon another in such manner that they are adjustable as to length; a lock nut on one of the said casing halves, and adapted to coact with the edge of the said other half of the casing; substantially cylindrical members of insulating material mounted within the said casing and in substantial axial alinement with each other, and rotatable independently of and with respect to each other and to the casing; grooved metal rings mounted in the adjacent ends of the said cylindrical members; metallic balls mounted between the said grooved rings; cables leading into the casing through the respective ends thereof; lugs on the said metal rings for connecting the latter to the said cables; a metal ball of relatively large diameter; metallic cups mounted substantially at the axial center of the said cylindrical members, the said cup retaining the metal ball between their adjacent faces; the said cylindrical members having recesses along their axial centers; stems mounted on said metallic cup and seated in said recesses; spring washers in said recesses around the stems, and acting on the said metallic cups to hold the latter in contact with the ball mounted between them; and lugs on the stems of the said metallic cups whereby the latter are connected to the said cables.

In testimony whereof, I have signed my name to this specification at Timaru, New Zealand, this 12th day of December, 1927.

CHARLES GOATER BAKER.